United States Patent
Firdaus et al.

(10) Patent No.: US 7,867,117 B2
(45) Date of Patent: Jan. 11, 2011

(54) IN-LINE BELT DRIVEN TILLE DRIVE CLUTCH

(75) Inventors: Usman Firdaus, Strongsville, OH (US); Philip B. Smith, Vermilion, OH (US)

(73) Assignee: MTD Products Inc, Valley City, OH (US)

( * ) Notice: Subject to any disclaimer, the term of this patent is extended or adjusted under 35 U.S.C. 154(b) by 739 days.

(21) Appl. No.: 11/887,708

(22) PCT Filed: Apr. 26, 2006

(86) PCT No.: PCT/US2006/015811

§ 371 (c)(1), (2), (4) Date: Oct. 2, 2007

(87) PCT Pub. No.: WO2006/118904

PCT Pub. Date: Nov. 9, 2006

(65) Prior Publication Data

US 2009/0270210 A1    Oct. 29, 2009

Related U.S. Application Data

(60) Provisional application No. 60/676,385, filed on Apr. 29, 2005.

(51) Int. Cl.
*F16H 55/56* (2006.01)
(52) U.S. Cl. ............................... 474/24; 474/9; 474/25; 474/95
(58) Field of Classification Search ............. 474/9, 474/10, 24, 25, 26, 27, 37, 53, 95, 96
See application file for complete search history.

(56) References Cited

U.S. PATENT DOCUMENTS

| 3,744,569 | A | | 7/1973 | Ehrlich |
| 3,996,811 | A | | 12/1976 | Reese |
| 4,095,479 | A | | 6/1978 | Lundberg |
| 4,196,859 | A | * | 4/1980 | Trott et al. ............... 239/677 |
| 4,223,771 | A | | 9/1980 | Petersen |
| 4,560,369 | A | * | 12/1985 | Hattori ...................... 474/28 |

(Continued)

FOREIGN PATENT DOCUMENTS

DE    3838754 A1    6/1989

(Continued)

*Primary Examiner*—Emmanuel M Marcelo
(74) *Attorney, Agent, or Firm*—Wegman, Hessler & Vanderburg

(57) ABSTRACT

A clutching mechanism (20) for a cultivating tiller. The tiller has an engine (16) mounted on a frame (12) with a rotatable output shaft (40), a rotatable working shaft (22), and a transmission (18) operatively connecting to the working shaft, the transmission having a rotatable transmission shaft (42) coaxially aligned with the output shaft of the engine. The clutching mechanism includes an upper half pulley (52) attached to the output shaft, and a lower half pulley (54) attached to the transmission shaft, wherein the upper half pulley and lower half pulley are coaxially positioned in a facing but non-contacting relationship such that the upper half pulley is able to freely rotate with respect to the lower half pulley. The clutching mechanism also includes a belt (62) positioned between the upper half pulley and the lower half pulley, and a tensioning assembly (70) configured to selectively tension the belt so that the belt transmits rotation of the upper half pulley to the lower half pulley.

20 Claims, 4 Drawing Sheets

U.S. PATENT DOCUMENTS

| | | |
|---|---|---|
| 5,254,041 A | 10/1993 | Duclo |
| RE37,728 E * | 6/2002 | Kamm .................. 474/37 |
| 6,421,903 B2 * | 7/2002 | Brown .................. 29/428 |
| 6,435,994 B1 * | 8/2002 | Friedmann et al. ......... 474/145 |
| 6,470,766 B2 | 10/2002 | Ohta et al. |
| 6,478,702 B2 * | 11/2002 | Borghi et al. ............. 474/37 |
| 6,488,101 B1 | 12/2002 | Miyahara et al. |
| 6,766,866 B2 | 7/2004 | Miyahara et al. |
| 6,811,504 B2 * | 11/2004 | Korenjak et al. .......... 474/14 |
| 2003/0096668 A1 * | 5/2003 | Yoshida et al. ............ 474/39 |
| 2009/0111623 A1 * | 4/2009 | Galletti et al. ............ 474/25 |

FOREIGN PATENT DOCUMENTS

| | | |
|---|---|---|
| GB | 912116 | 12/1962 |

* cited by examiner

IN-LINE BELT DRIVEN TILLE DRIVE CLUTCH

CROSS-REFERENCE TO RELATED APPLICATION

The present application claims priority under 35 U.S.C. §119(e) to U.S. Provisional Patent Application No. 60/676,385, filed Apr. 29, 2005.

BACKGROUND OF THE INVENTION

1. Field of Invention

This invention relates generally to a cultivating tiller having an engine disposed above the tines, and more particularly, to an in-line clutching mechanism for selectively transmitting power from the engine to the tines.

2. Description of Related Art

It is known to provide cultivating tillers with tilling tines or claws attached to a rotatable tilling shaft for cultivating the soil. With front tine tillers, the engine is preferably mounted above the tines so that the weight of the engine can be used to help the tines dig into the soil to improve tilling operations. To provide this orientation, typical prior art tillers have had to use a complicated gearing arrangement including a centrifugal clutch mechanism to selectively engage and disengage the driven shaft from the power source as shown in U.S. Pat. No. 6,766,866 or a hydrostatic transmission as shown in U.S. Pat. No. 6,488,101.

In other tillers, power to rotate the tines is taken from a rotating output shaft of the engine through a V-belt which engages a pulley affixed to the output shaft. A driven shaft also has a pulley affixed thereto and the rotation of the output shaft is imparted to the driven shaft by the belt wrapped about the pulleys. An idler system controls the tension of the belt. With these tillers, the operator is required to correctly adjust the tension on the belt. Improper adjustments can lead to reduced belt life and decreased performance of the tiller. Additionally, the belt is located where the operator's fingers could come in contact with the rotating belt, presenting an undesirable safety hazard and requiring the installation larger covers to shield the operator. The larger covers add to the cost of the machine and increase the complexity of the manufacturing process.

The described invention, however, is an improvement over the prior art machine in that an improved clutching mechanism is provided that enables manufacturing cost reductions and reduced operator maintenance operations while meeting present safety standards.

SUMMARY OF THE INVENTION

In one aspect of the invention, the invention is directed to a tiller for cultivating the soil. The tiller includes a frame and a power source mounted on the frame having a rotatable output shaft. The tiller also includes a rotatable tillage shaft having a plurality of tillage tines mounted thereon and a transmission operatively connecting to the tillage shaft. The transmission has a rotatable transmission shaft coaxially aligned with the output shaft of the power source. The tiller also has a clutching mechanism selectively engaging the transmission shaft to the output shaft of the power source to thereby enable rotation of the tillage tines for tilling the soil. The clutching mechanism includes an upper half pulley attached to the output shaft, a lower half pulley attached to the transmission shaft, and a belt positioned between the upper half pulley and the lower half pulley. A tensioning assembly is configured to selectively tension the belt so that the belt transmits rotation of the upper half pulley to the lower half pulley.

According to another aspect, the invention is a tiller for cultivating the soil. The tiller includes a flame, a power source having a rotatable output shaft, a rotatable tillage shaft having a plurality of tillage tines mounted thereon, and a transmission operatively connecting to the tillage shaft. The transmission has a rotatable transmission shaft coaxially aligned with the output shaft of the power source. The tiller also includes a clutching mechanism selectively engaging the transmission shaft to the output shaft of the power source to thereby enable rotation of the tillage tines for tilling the soil. The clutching mechanism includes an upper half pulley attached to the output shaft and a lower half pulley attached to the transmission shaft, wherein the upper half pulley and lower half pulley are coaxially positioned in a facing but non-contacting relationship such that the upper half pulley is able to freely rotate with respect to the lower half pulley.

The clutching mechanism also includes a belt positioned between the upper half pulley and the lower half pulley. A tensioning assembly is configured to selectively tension the belt so that the belt transmits rotation of the upper half pulley to the lower half pulley. The tensioning assembly includes a bracket pivotably mounted to the frame with a pivot and a tensioning pulley rotatably mounted on the bracket, wherein the V-belt wraps around upper and lower half pulleys and the tensioning pulley. In one embodiment, the upper half pulley has a first belt engagement and driving surface and the lower half pulley has a second and oppositely disposed belt engagement and driving surface, wherein the first and second driving and engagement surfaces form a V-shaped notch at outer circumferential edges of the upper and lower pulley halves.

In another aspect of the invention, the invention is a clutching mechanism for use with a working machine. The working machine has an engine mounted on a frame with a rotatable output shaft, a rotatable working shaft, and a transmission operatively connecting to the working shaft. The transmission has a rotatable transmission shaft coaxially aligned with the output shaft of the engine. The clutching mechanism selectively engages the transmission shaft to the output shaft of the engine to thereby enable rotation of the working shaft. The clutching mechanism includes an upper half pulley attached to the output shaft, and a lower half pulley attached to the transmission shaft, wherein the upper half pulley and lower half pulley are coaxially positioned in a facing but non-contacting relationship such that the upper half pulley is able to freely rotate with respect to the lower half pulley. The clutching mechanism also includes a belt positioned between the upper half pulley and the lower half pulley, and a tensioning assembly configured to selectively tension the belt so that the belt transmits rotation of includes comprising a bracket pivotably mounted to the frame with a pivot and a tensioning pulley rotatably mounted on the bracket, wherein the V-belt wraps around upper and lower half pulleys and the tensioning pulley. In one embodiment, the tensioning assembly further includes at least one belt keeper adjacent to an outer circumferential edge of the tensioning pulley configured to maintain the V-belt on the tensioning pulley such that when the bracket is moved to slacken the V-belt, the belt keepers keep the V-belt in close proximity to the tensioning pulley so that the V-belt moves out of the notch formed by the upper and lower half pulleys.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF THE PREFERRED EMBODIMENT

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
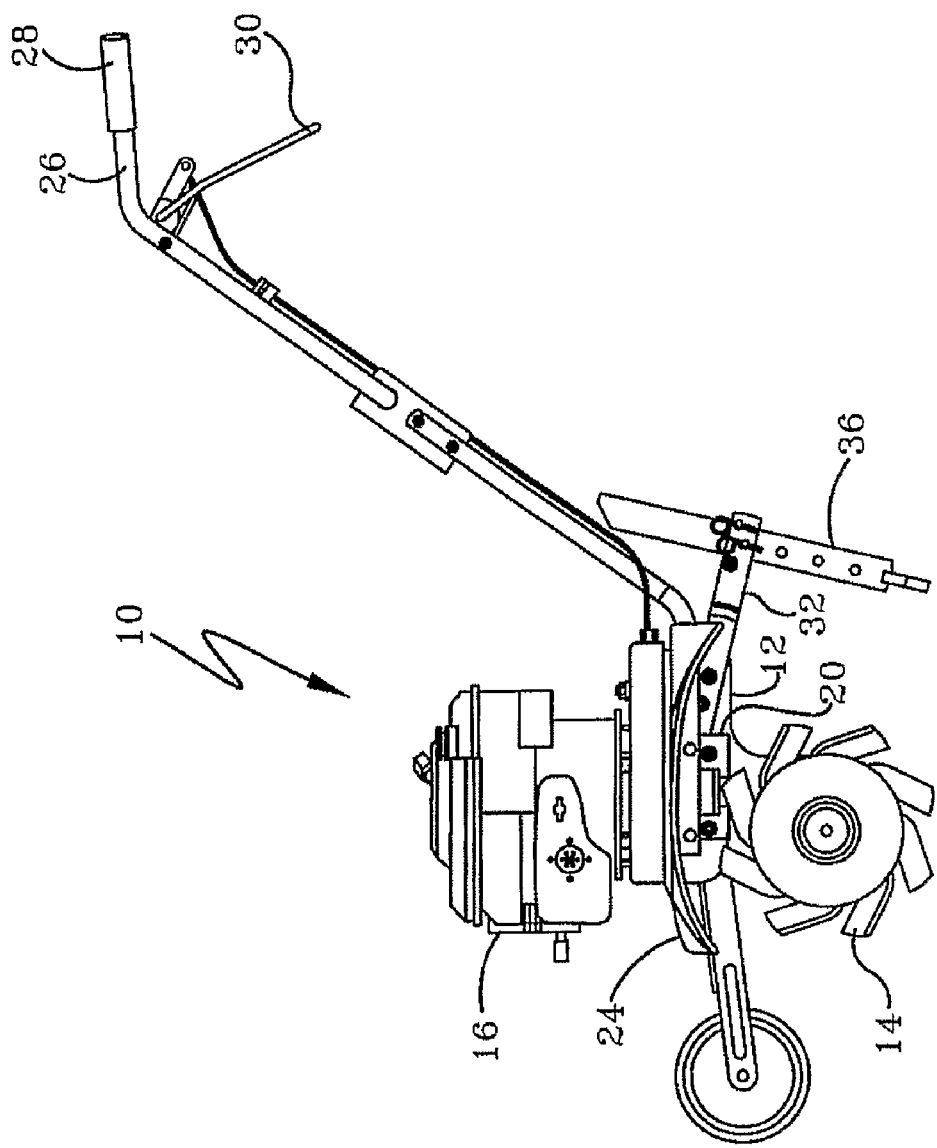
FIG. 1 is a perspective view of a tiller embodying the invention.

Referring to FIG. 1, an exemplary walk-behind tiller 10 includes a tiller frame 12 rotatably supporting right and left tillage tines 14. Mounted on the frame 12 is a motive power source or an engine 16 for producing a motive power. The engine 16 connects with a transmission 18 through a clutching mechanism 20 that will be described in detail below. The motive power produced by the engine 16 is transmitted through the clutching mechanism 20 and the transmission 18 to a working or tillage shaft 22. The tillage tines 14 are mounted on the tillage shaft 22 so that transmission of the motive power of the engine 16 to the tillage shaft 22 causes the tillage tines 14 to perform tilling operations.

A cover 24 is disposed above the tines 14 and attached to the frame 12 to prevent soil having undergone the tilling operation from being scattered. The tiller 10 also includes a handle 26 rigidly connected to the frame 12. The handle 26 has right and left grips 28 attached thereto so that an operator may maneuver the tiller 10 as desired. An operation lever 30 is attached to at least one of the grips 18 to operatively control the clutching mechanism 20 as will be set forth in detail below. The tiller 10 includes a rod 32 extending rearwardly from the frame 12. The rod 32 has a skid 36 extending downwardly from a lower part thereof. The skid 36 is to pierce the ground to a depth at which the tillage tines 14 perform the tilling operation. In addition, the skid 36 provides a resistance to the locomotion force produced by the tiller tines 14 to propel the tiller 10. As seen in the illustrated embodiment, having the engine 16 vertically above the tillage tines 14 allows the weight of the engine to be effectively used to help the tines dig into the soil to improve tilling operations. It is noted that the illustrated embodiment relates to a tiller 10 of the type often called a "front-tine tiller", however, the invention may be incorporated into other working machines such as snow-throwers and other applications as well.

Figure 2:
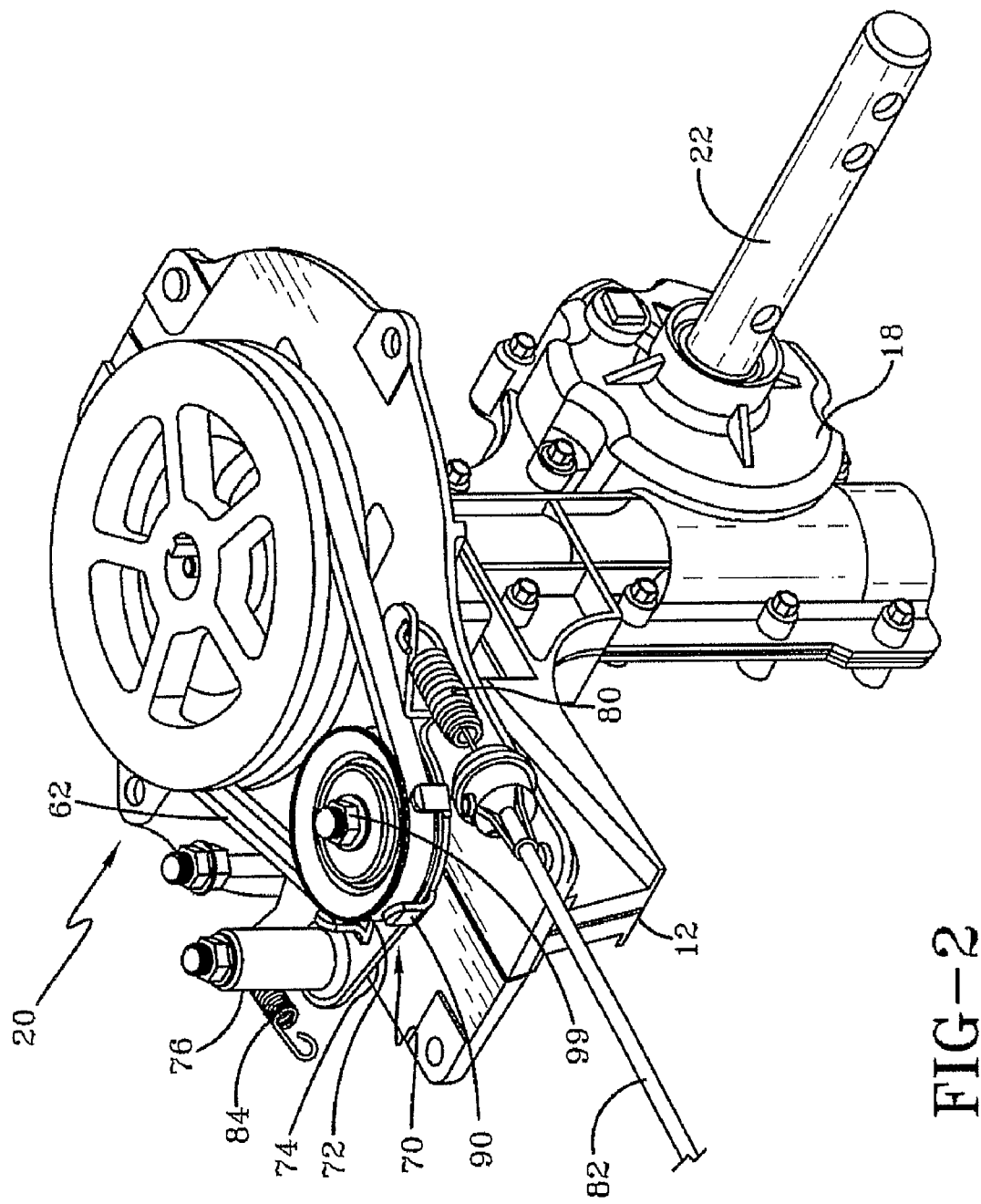
FIG. 2 is a cross-section view of a portion of the tiller taken along line 2-2 of FIG. 1 illustrating the clutching mechanism according to the invention.

Turning to FIG. 2, the engine 16 is a prime mover having an output shaft or a crankshaft 40 extending vertically and downwardly. The transmission 18 is positioned generally centrally of the tiller frame 12 and includes a transmission shaft 42 oriented in a coaxial relationship with the output shaft 40 of the engine 16. The transmission 18 further includes a worm gear mechanism 44 for transmitting the motive power from the transmission shaft 42 to the horizontally extending tillage shaft 22. The worm gear mechanism 44 includes a worm 46 serving as a driving gear. Desirably, the worm 46 is formed integrally with the transmission shaft 42. The worm gear mechanism 44 further includes a worm wheel 48 serving as a driven gear. The wheel 48 is coupled to the center of the tillage shaft 22 such that the tillage shaft extends horizontally and transversely from opposite side ends thereof in a widthwise direction of the tiller frame 12. The transmission shaft 42, the worm 46, and the worm wheel 48 are all housed in a transmission case 50. The transmission case 50 includes a first bearing 52 and a second bearing 54 for supporting the transmission shaft 42. As will be understood, the transmission 18 of power from the transmission shaft 42 to the tillage tines 14 can be through convention means understood by those skilled in the art and need not be discussed in further detail.

According to the invention, the clutching mechanism 20 operatively and selectively connects the output shaft 40 of the engine 16 to the transmission shaft 42 of the transmission 18, and thus to the tillage shaft 22. The clutching mechanism 20 includes an upper half pulley 52 connected to the output shaft 40 of the engine 16 and a lower half pulley 54 connected to the transmission shaft 42 of the transmission 18. The upper half pulley 52 is mounted to the output shaft 40 for rotation therewith with threaded fastener 55. Desirably, the upper half pulley 52 functions as a flywheel for the engine 16, although the upper half pulley 52 and flywheel may also be formed as separate components without departing from the invention. Similarly, the lower half pulley 54 is mounted to the transmission shaft 42 for rotation therewith with threaded fastener 57. As illustrated, the pulley halves 52, 54 are mounted to respective shafts 40, 42 with fasteners 55, 57, however, one skilled in the art will appreciate that the pulley halves may also be attached using other means, such as welding, using sound engineering judgment. The upper half pulley 52 and lower half pulley 54 are coaxially positioned with respect to each other in a facing relationship and are disposed in planes normal to the aligned central axes of the output shaft 40 and the transmission shaft 42. In such orientation, the upper and lower half pulleys 52, 54 do not substantially touch as best seen in FIG. 2, and the upper half pulley 52 is able to freely rotate with respect to the lower half pulley 54.

At its outer periphery, the upper half pulley 52 has a belt engagement and driving surface 56 which slopes or tapers radially inward. Similarly, the lower half pulley 54 has a belt engagement and driving surface 58 which also slopes radially inwardly. Oppositely disposed driving and engagement surfaces 56, 58 cooperate to form a generally V-shaped notch 60 at the outer circumferential edges of the pulley halves 52, 54 and are configured receive a V-belt 62 in a driving engagement between the upper half pulley 52 and the lower half pulley 54. The V-belt 62 can be of known conventional design commonly used with pulleys. In an engaged position of the V-belt 62, rotation of the upper half pulley 52 is transmitted into rotation of the lower half pulley 54 by the V-belt 62.

Figure 3:
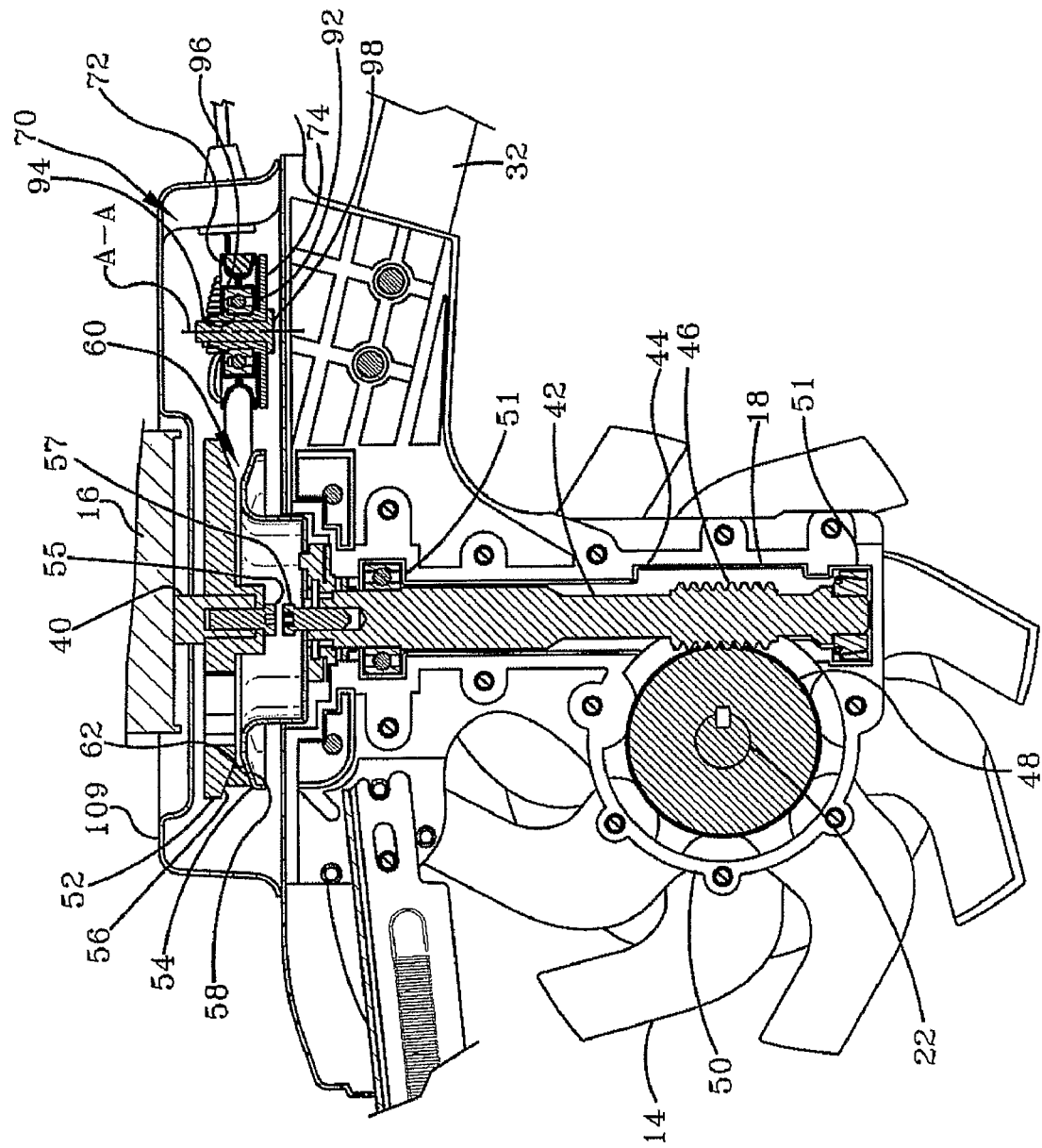
FIG. 3 is a perspective view of the clutching mechanism of FIG. 2.
Figure 4:
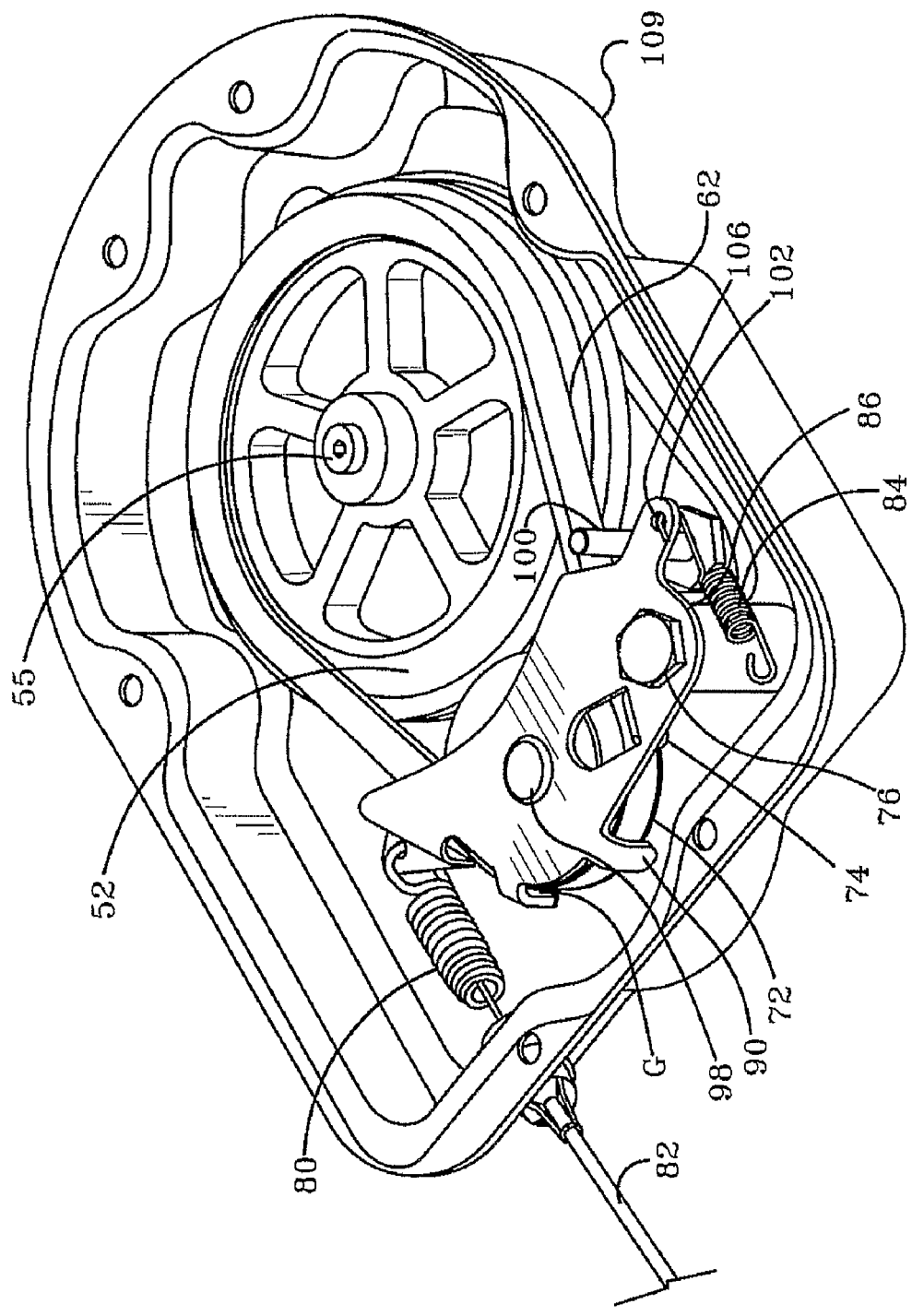
FIG. 4 is an inverted perspective view of a portion of the clutching mechanism of FIG. 2.

Turning also now to FIGS. 3 and 4, the V-belt 62 is selectively held in either the engaged position or permitted to slack to a declutched position with a tensioning assembly 70. The tensioning assembly 70 comprises a tensioning pulley 72 rotatable about axis AA (best seen in FIG. 2) that is mounted on a bracket 74. The tensioning assembly 70 is positioned such that the V-belt 62 wraps around the pulley halves 52, 54 and the tensioning pulley 72. The bracket 74 is pivotably mounted to the frame 12 with a pivot 76. When the bracket 74 is pivoted to a first orientation, the axis AA of the tensioning pulley 72 is moved away from the axes of the upper and lower pulley halves 52, 54 to tension the V-belt 62. In this orientation, the V-belt 62 is pulled into the engaged position in the V-shaped notch 60 at the circumferential edge of the pulley halves 52, 54. With the V-belt under tension and contacting the engaging and driving surfaces 56, 58 of the pulley halves 52, 54, the pulley halves rotate together so that rotation of the output shaft 40 is transmitted to the transmission shaft 42.

The bracket 74 can also pivot to a second orientation such that the axis AA of the tensioning pulley 72 is moved nearer to the axes of the upper and lower pulley halves 52, 54 so as to slacken the V-belt 62. In this orientation, the V-belt 62 moves out of the V-shaped notch 60 at the circumferential edge of the pulley halves 52, 54. Without the V-belt 62 under tension to transmit the rotation from the upper half pulley 52 to the lower half pulley 54, the output shaft 40 of the engine 16 rotates without causing the transmission shaft 42 to rotate. Thus, when the bracket 74 is in the first orientation, the clutching mechanism 20 is "engaged", or in other words, rotation of the output shaft 40 of the engine 16 causes rotation of the tillage shaft 22. When the bracket 74 is in the second orientation, the clutching mechanism 20 is "disengaged", such that rotation of the output shaft 40 is not translated into rotation of the tillage shaft 22. Thus, in the disengaged position, the engine 16 is permitted to run without causing the tines 14 to rotate.

The bracket 74 is pivoted into the first orientation with an actuator 80 that is controlled by the operator of the tiller 10 by means of a cable 82 extending to the operating lever 30 (FIG. 1) on the handle 26 of the tiller 10. In one embodiment, the actuator 80 includes a coil spring 81. Desirably, the bracket 74 is biased to return to the declutched position with a biasing spring 84 when the operator releases the operating lever 30. As best seen in FIG. 4, the bracket 74 is generally elongate with the pivot 76 and the biasing spring 84 on a first end 86 of the bracket 74 and the actuator 80 attached to the bracket on a second end 88 of the bracket 74. One or more belt keepers 90 extend from the bracket 74 adjacent to the outer circumferential edge of the tensioning pulley 72. The belt keepers 90 are positioned such that when the V-belt 62 is tensioned, there is a small gap G (best seen in FIG. 4) between the V-belt 62 and the pulley 72 so that the V-belt 62 and pulley 72 rotate without contacting the belt keepers 90. When the bracket 74 is moved to slacken the V-belt 62, the belt keepers 90 keep the V-belt in close proximity to the tensioning pulley 72 so that the stiffness of the V-belt cause the belt to move out of the V-shaped notch 60 formed by the pulley halves 52, 54. The belt keepers 90 and the stiffness of the V-belt cooperate to disengage the V-belt 62 from the engaging and driving surfaces 56, 58 of the pulley halves 52, 54 when the bracket 74 is moved to the disengaged position so that the V-belt doesn't jam in the V-shaped notch 60 and inadvertently permit rotation of the transmission shaft 42 when in the disengaged position.

As best seen in FIG. 2, the tensioning pulley 72 is rotatably mounted on the bracket 74 by means of a bearing 92. Desirably, the bearing 92 is a sealed roller or ball bearing assembly having an inner race 94 and outer race 96. As seen in FIG. 2, the inner race 94 of the bearing 92 is positioned on an axle bolt 98. The axle bolt 98 is connected to the bracket 74 by a welded or threaded mechanical connection. The tensioning pulley 72 is attached to the outer race 96 of the bearing 92 so that the pulley can be freely rotated on the bracket 74. A nut 99 is threaded on the upper end of the axle bolt 98 to secure the tensioning pulley 72 to the bracket 74.

A stop 100 connected to the frame 12 of the tiller 10 is configured to contact the bracket 74 upon full travel of the bracket 74 into the first orientation. As illustrated, a protrusion 102 extends from the bracket 74 on the first end 86 of the bracket 74. The protrusion 102 contacts the stop 100 when the bracket 74 is pivoted by the actuator 80. However, one skilled in the art will understand that the stop 100 and bracket 74 may be configured in many ways using sound engineering judgment to limit the range of pivoting motion of the bracket 74. In one embodiment, the biasing spring 84 attaches to the bracket 74 through hole 106 in the protrusion 102 and is connected at its opposite end to the frame 12 to assert a force on the bracket 74 against the pull of the actuator 80 so that the bracket 74 is biased to return to a position that imparts slack to the V-belt 62.

As seen in the illustrated embodiment, having the input shaft of the engine 16 and the transmission shaft 42 in a vertical and coaxial relationship desirably permits the engine 16 to be mounted generally above the tillage tines 14 so that the weight of the engine 16 can be effectively used to help the tines 14 dig into the soil to improve tilling operations. The clutching mechanism 20 is desirably shielded by a cover 109 so that the operator does not have access to the clutching mechanism, and specifically the rotating V-belt 62, from above the cover 24 to prevent injuries.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A tiller for cultivating the soil, the tiller comprising:
   a frame;
   a power source mounted on the frame having a rotatable output shaft;
   a rotatable tillage shaft having a plurality of tillage tines mounted thereon;
   a transmission operatively connecting to the tillage shaft, said transmission having a rotatable transmission shaft coaxially aligned with the output shaft of the power source;
   a clutching mechanism selectively engaging the transmission shaft to the output shaft of the power source to thereby enable rotation of the tillage tines for tilling the soil, said clutching mechanism comprising an upper half pulley attached to the output shaft, a lower half pulley attached to the transmission shaft, a belt positioned between said upper half pulley and said lower half pulley, and a tensioning assembly configured to selectively tension said belt so that the belt transmits rotation of the upper half pulley to the lower half pulley.

2. The tiller of claim 1 wherein the upper half pulley and lower half pulley are coaxially positioned in a facing but non-contacting relationship such that the upper half pulley is able to freely rotate with respect to the lower half pulley.

3. The tiller of claim 2 wherein the upper half pulley has a first belt engagement and driving surface and the lower half pulley has a second and oppositely disposed belt engagement and driving surface, wherein said first and second driving and engagement surfaces form a V-shaped notch at outer circumferential edges of the upper and lower pulley halves.

4. The tiller of claim 3 wherein the belt is a V-belt that is received in said notch in a driving engagement between the upper half pulley and the lower half pulley.

5. The tiller of claim 4 wherein the upper half pulley is the flywheel of the engine.

6. The tiller of claim 4 wherein the tensioning assembly comprises a bracket and a tensioning pulley rotatably mounted on said bracket, wherein the V-belt wraps around upper and lower half pulleys and the tensioning pulley.

7. The tiller of claim 6 wherein the bracket is pivotably mounted to the frame with a pivot.

8. The tiller of claim 7 wherein the bracket is pivotable between to a first orientation wherein the tensioning pulley is moved away from the upper and lower half pulleys to tension the V-belt such that V-belt is pulled into the notch and a second orientation wherein the tensioning pulley is moved nearer to the upper and lower half pulleys so as to slacken the V-belt such that the output shaft rotates without causing the transmission shaft to rotate.

9. The tiller of claim 8 wherein the bracket is pivoted to a clutched position with an actuator coupled to an operating lever on a handle of the tiller and the bracket is biased to return to a declutched position with a biasing spring when an actuating force is removed from the operating lever.

10. The tiller of claim 6 wherein the tensioning assembly further comprises at least one belt keeper adjacent to an outer circumferential edge of the tensioning pulley configured to maintain the V-belt on the tensioning pulley such that when the bracket is moved to slacken the V-belt, the at least one belt keeper keeps the V-belt in close proximity to the tensioning pulley so that the V-belt moves out of the notch formed by the upper and lower half pulleys.

11. The tiller of claim 6 wherein the tensioning pulley is rotatably connected to the bracket by means of a ball bearing assembly having an inner race and outer race.

12. A tiller for cultivating the soil, the tiller comprising:
a frame;
a power source mounted on the frame having a rotatable output shaft;
a rotatable tillage shaft having a plurality of tillage tines mounted thereon;
a transmission operatively connecting to the tillage shaft, said transmission having a rotatable transmission shaft coaxially aligned with the output shaft of the power source;
a clutching mechanism selectively engaging the transmission shaft to the output shaft of the power source to thereby enable rotation of the tillage tines for tilling the soil, said clutching mechanism comprising:
an upper half pulley attached to the output shaft;
a lower half pulley attached to the transmission shaft, wherein the upper half pulley and lower half pulley are coaxially positioned in a facing but non-contacting relationship such that the upper half pulley is able to freely rotate with respect to the lower half pulley,
a belt positioned between said upper half pulley and said lower half pulley; and
a tensioning assembly configured to selectively tension said belt so that the belt transmits rotation of the upper half pulley to the lower half pulley, the tensioning assembly comprising a bracket pivotably mounted to the frame with a pivot and a tensioning pulley rotatably mounted on said bracket, wherein the belt wraps around upper and lower half pulleys and the tensioning pulley.

13. The tiller of claim 12 wherein the upper half pulley has a first belt engagement and driving surface and the lower half pulley has a second and oppositely disposed belt engagement and driving surface, wherein said first and second driving and engagement surfaces form a V-shaped notch at outer circumferential edges of the upper and lower pulley halves.

14. The tiller of claim 13 wherein the bracket is pivotable between to a first orientation wherein the tensioning pulley is moved away from the upper and lower half pulleys to tension the V-belt such that V-belt is pulled into the notch and a second orientation wherein the tensioning pulley is moved nearer to the upper and lower half pulleys so as to slacken the V-belt such that the output shaft rotates without causing the transmission shaft to rotate.

15. The tiller of claim 14 wherein the bracket is pivoted to a clutched position with an actuator coupled to an operating lever on a handle of the tiller and the bracket is biased to return to a declutched position with a biasing spring when an actuating force is removed from the operating lever.

16. The tiller of claim 15 wherein the tensioning assembly further comprises at least one belt keeper adjacent to an outer circumferential edge of the tensioning pulley configured to maintain the V-belt on the tensioning pulley such that when the bracket is moved to slacken the V-belt, the belt keepers keep the V-belt in close proximity to the tensioning pulley so that the V-belt moves out of the notch formed by the upper and lower half pulleys.

17. The tiller of claim 12 wherein the tensioning pulley is rotatably connected to the bracket by means of a ball bearing assembly having an inner race and outer race.

18. A clutching mechanism for use with a working machine, the working machine having an engine mounted on a frame with a rotatable output shaft, a rotatable working shaft, and a transmission operatively connecting to the working shaft, said transmission having a rotatable transmission shaft coaxially aligned with the output shaft of the engine, the clutching mechanism selectively engaging the transmission shaft to the output shaft of the engine to thereby enable rotation of the working shaft, the clutching mechanism comprising:
an upper half pulley attached to the output shaft;
a lower half pulley attached to the transmission shaft, wherein the upper half pulley and lower half pulley are coaxially positioned in a facing but non-contacting relationship such that the upper half pulley is able to freely rotate with respect to the lower half pulley,
a belt positioned between said upper half pulley and said lower half pulley; and
a tensioning assembly configured to selectively tension said belt so that the belt transmits rotation of the upper half pulley to the lower half pulley, the tensioning assembly comprising a bracket pivotably mounted to the frame with a pivot and a tensioning pulley rotatably mounted on said bracket, wherein the belt wraps around upper and lower half pulleys and the tensioning pulley.

19. The clutching mechanism of claim 18 wherein the upper half pulley has a first belt engagement and driving surface and the lower half pulley has a second and oppositely disposed belt engagement and driving surface, wherein said first and second driving and engagement surfaces form a V-shaped notch at outer circumferential edges of the upper and lower pulley halves, wherein the bracket is pivotable between a first orientation wherein the tensioning pulley is moved away from the upper and lower half pulleys to tension the V-belt such that V-belt is pulled into the notch and a second orientation wherein the tensioning pulley is moved nearer to the upper and lower half pulleys so as to slacken the V-belt such that the output shaft rotates without causing the transmission shaft to rotate.

20. The clutching mechanism of claim 18 wherein the tensioning assembly further comprises at least one belt keeper adjacent to an outer circumferential edge of the tensioning pulley configured to maintain the belt on the tensioning pulley such that when the bracket is moved to slacken the belt, the at least one belt keeper keeps the belt in close proximity to the tensioning pulley so that the belt moves out of the notch formed by the upper and lower half pulleys.

* * * * *

UNITED STATES PATENT AND TRADEMARK OFFICE
CERTIFICATE OF CORRECTION

| | | |
|---|---|---|
| PATENT NO. | : 7,867,117 B2 | Page 1 of 1 |
| APPLICATION NO. | : 11/887708 | |
| DATED | : January 11, 2011 | |
| INVENTOR(S) | : Usman Firdaus and Philip B. Smith | |

It is certified that error appears in the above-identified patent and that said Letters Patent is hereby corrected as shown below:

Title page, Item (54) please correct the title IN-LINE BELT DRIVEN TILLE DRIVE CLUTCH to read as IN-LINE BELT DRIVEN TILLER DRIVE CLUTCH In the Specifications:

Column 1, Line 1, Title should read:
IN-LINE BELT DRIVEN TILLER DRIVE CLUTCH

Signed and Sealed this
Eighth Day of March, 2011

David J. Kappos
*Director of the United States Patent and Trademark Office*